(12) United States Patent
Parmentier et al.

(10) Patent No.: US 6,258,425 B1
(45) Date of Patent: Jul. 10, 2001

(54) PACKAGING AND LIDDING MATERIAL

(75) Inventors: René Parmentier, Buhl; Raymond Gribling, Reding; Grégoire Weber, Sarraltroff; Claude A. Marbler, Phalsbourg, all of (FR)

(73) Assignee: Alusuisse Technology & Management Ltd., Neuhausen AM Rheinfall ( * ) Notice: Subject to any disclaimer, the term of this patent is extended or adjusted under 35 U.S.C. 154(b) by 0 days.

(21) Appl. No.: 09/116,208

(22) Filed: Jul. 16, 1998

(30) Foreign Application Priority Data

Jul. 17, 1997 (EP) .................................................. 97810503

(51) Int. Cl.$^7$ .................................................. B65D 41/12
(52) U.S. Cl. ...................... 428/40.1; 215/347; 215/349; 428/40.9; 428/41.8; 428/42.1; 428/42.2
(58) Field of Search ................... 428/40.1, 40.9, 428/41.8, 42.1, 42.2; 215/347, 349, DIG. 2

(56) References Cited

U.S. PATENT DOCUMENTS

| 4,479,838 | * | 10/1984 | Dunsirn | 428/352 |
| 5,342,684 | * | 8/1994 | Carespodi | 428/347 |

FOREIGN PATENT DOCUMENTS

| 0 349 670 | 9/1988 | (EP) . |
| 2 463 468 | 4/1980 | (FR) . |
| WO 92 07347 | 4/1992 | (WO) . |
| WO 97 29968 | 8/1997 | (WO) . |

* cited by examiner

*Primary Examiner*—Nasser Ahmad
(74) *Attorney, Agent, or Firm*—Fisher, Christen & Sabol

(57) ABSTRACT

Packaging or lidding material containing at least two layers of material, and between the two layers hidden information in the form of a printed image viz., information that is visible only after peeling the first layer from the second layer. The packaging material serves the manufacture of film-type packaging or parts thereof, or as lidding material for containers. The packaging or lidding material of a packaging unit contains the following sequence of layers:

a) a first layer of material,
b) a printed pattern or image, the limits of which lie within the dimensions of the package in question or the lid of the packaging unit,
c) a dividing layer, the dimensions of which are the same or greater than the printed image b) and smaller than the dimensions of the packaging or lid of the package,
d) an adhesive layer covering the whole of the surface,
e) a second layer of material, where the printed image b) can be made visible by lifting the first layer of material a) from the second layer of material e).

14 Claims, 1 Drawing Sheet

PACKAGING AND LIDDING MATERIAL

BACKGROUND OF THE INVENTION

1. Field of the Invention

The present invention relates to a film-type of packaging material for manufacturing forms of packaging or parts thereof, or lidding material for containers, containing at least two layers of material.

2. Background Art

It is known to fill e.g. luxury foodstuffs such as chocolate bars, sweets and other sweet items into e.g. pouches or sweet foodstuffs such as yoghurt, jams, preserved fruit or other creamy dessert foodstuffs including dehydrated pre-prepared foodstuffs and drinks into beakers or glass jars, and to seal the beakers or glass jars with a lidding film. Foodstuffs such as cheese in the form of fresh cheeses, soft cheeses and cheeses for melting etc. may be offered for sale in film pack or in a box. A package in the form of a bag or pouch e.g. for coffee, ready-made soups, confectionery items etc. or an already-lidded glass or beaker may have a strip of material or sealing strip adhesively attached.

BROAD DESCRIPTION OF THE INVENTION

The object of the present invention is to provide a packaging material for manufacturing film-type or box-type packaging or a lidding material for containers, or to provide a packaging material for manufacturing parts of packaging forms such as strips which, in order to increase the attractiveness of products packaged in such a manner, e.g. a competition, or information on the packaging material which is concealed at purchase and is designed to awaken the curiosity of the purchaser. The solution to the competition or the information should be made available to the purchaser only after purchase, and then accessible in a simple manner. The packaging material which is usable in the described manner should be easy to manufacture and easy to use and, in the process of acquiring the information, it should appeal to the playing instinct.

That objective is achieved by way of the invention in that the packaging or lidding material of a package contains the following sequence of material layers:
a) a first layer of material,
b) a printed pattern, the limits of which lie within the dimensions of the package in question or the lid thereof,
c) a dividing layer, the dimensions of which are the same or greater than the printed pattern b) and smaller than the dimensions of the packaging or lid of the package,
d) an adhesive layer covering the whole of the surface,
e) a second layer of material,
where the printed pattern b) can be made visible by lifting the first layer of material a) from the second layer of material e).

DETAILED DESCRIPTION OF THE INVENTION

The packaging or lidding material according to the present invention is in the form of a laminate or composite and is usefully manufactured in the form of sheets or as endless rolls or coils and the individual packaging materials made e.g. into boxes, pouches or sachets by cutting or stamping out etc. and sealing or adhesive bonding these together. The rolls of material may also be processed by cutting or stamping into wraps for small goods or for wrapping items such as cheese, or for boxes etc. The lidding material may be in the form of endless strips or as rolls and by stamping or cutting out, the individual lids may be produced before sealing or bonding onto the container.

The packaging or lidding material features a first layer a) and a second layer e). The first and the second layers contain e.g.—independent of each other—a paper, a plastic monofilm or a plastic composite or a metal foil or a composite of two or more of these materials.

The papers for the layers a) and e) may e.g. be cellulose papers and printing papers made therefrom. It may also be newspaper material, papers for printing illustrations, writing paper, drawing paper, papers for labels and office papers. Preferred are printing papers. These are e.g. papers for relief printing, for printing books or newspapers, papers for surface printing and papers for photogravure printing. Useful are printing papers having a weight per unit area of 18 to 250 g/m$^2$. Preferred are papers having a weight per unit area of 18 to 120 g/m$^2$. As a rule the papers are unlined papers. The papers may be white or colored. The coloring may be achieved e.g. by through-thickness coloring, by coloring the surface in the gluing press, immersion coloring or surface coloring by brushing. The coloring may be bright or multicolored. The papers may also be environmentally favourable in their manufacture i.e. made without adding acids such as sulfuric acid, and/or chlorine-bleaching. It is also possible to use recycled paper. Apart from the papers mentioned it is also possible to use papers made from synthetic fibers. Security paper containing security chemicals or threads or fibers may also be used. If desired the papers may be coated and/or laminated e.g. by coating methods such as extrusion coating, dispersion coating and organic coating. The coating may be an organic coating, a wax, paraffin or a hot-melt coating. A laminating process may be employed to join e.g. a strip of paper to a pre-made plastic film. Other processes that may be used are methods of coating from the vapor phase in vacuum (chemical vapour deposition or physical deposition).

The monofilms of plastics or film composites may be made of or contain thermoplastics based on polyesters, polyamides, polyolefins, polystyrols, polyvinylchloride, polycarbonates or from viscose etc.

Suitable polyesters are e.g. polyalkylene-terephthalates such as polyethylene-terephthalate, or the polyethylene-terephthalates known as A-PET, PETP, PETG or G-PET. Preferred thicknesses are 6 to 50 $\mu$m, in particular 10 to 36 $\mu$m or 12 $\mu$m.

Polyamides are e.g. polyamide 6 and 6.6; polyamide 11; polyamide 12; polyamide 6.12; polyamide 6-3-T etc.

Polyolefins are e.g. polyethylenes such as polyethylenes of low, medium or high density, linear polyethylenes of low, medium or high density, such as amorphous, crystalline or highly crystalline polypropylene, oriented polypropylene or mixtures containing the above mentioned polyolefins. Preferred thicknesses for polypropylenes are 6 to 50 $\mu$m, in particular 10 to 36 $\mu$m or 20 $\mu$m.

Examples of polystyroles are thermoplastic polystyrole, copolymers and polyblends of styrole such as styrole/acrylnitrile-copolymers or styrole/butadiene-grafted polymers etc.

The above mentioned films of thermoplastics are employed in thicknesses e.g. of 6 to 200 $\mu$m, usefully 10 to 100 $\mu$m and, in the absence of any other specification, preferably from 20 to 80 $\mu$m.

The films of the above mentioned thermoplastics may be non-stretched or axially or biaxially stretched. The films may also contain filler materials such as talcum, glass, quartz, mica, chalk, barium sulfate, zinc oxide, titanium oxide etc. in amounts of e.g. 2 to 60 wt. %.

By cellulose is understood e.g. regenerated cellulose, so called cellulose hydrate, also known as cellophane. The cellulose films are e.g. 8 to 200 µm thick.

The above mentioned thermoplastics may also be laminate coated in some cases with bonding agents and laminating adhesives or by coextrusion etc. to form plastic film composites containing two, three or more monofilms. The plastic composites may be e.g. 16 to 200 µm thick.

The plastics may be transparent, translucent or opaque and non-colored, have colored surfaces or be colored through.

The metal foil is e.g. an aluminum, iron or steel foil, aluminum foil being preferred. The aluminum foil may be of pure aluminum or of an AlFeMn aluminum alloy such as AlFe1.5Mn, AlFeSi or AlFeSiMn, for example having a purity of 99.7% and higher, preferably 98.5% and higher. The metal foil may be e.g. 6 to 100 µm thick, preferably 6 to 60 µm.

For the layers a) and e) it is also possible to employ—independent of each other—multilayer composites containing the mentioned papers, plastic films, plastic composites, papers or plastic films or composites that are metallized on one or both sides, and/or metal foils.

The papers and plastics or multilayer composites made therefrom for layers a) and e) may be metallized i.e. exhibit metallic coatings. Metallizing may be performed e.g. by a vacuum thin layer deposition process or by sputtering etc., the layer deposited on the surface in question being e.g. 10 to 60 nm, preferably 10 to 30 nm (nanometers) thick. Suitable metals for deposition are e.g. aluminum, iron, steel, nickel, copper, silver etc.

Plastic composites and also papers may contain barrier layers to diffusion e.g. in the form of an ethylvinylalcohol film, a polyvinylidene film or a ceramic layer. The ceramic layer may be 5 to 500 nm (nanometers) thick layer deposited by a vacuum thin layer deposition process (chemical vapor deposition, physical vapor deposition), said layer being of oxides or nitrides or mixtures thereof, metals or semi-metals such as e.g. $SiO_x$ or $AlyO_z$, where x represents a number from 1.1 to 1.9, and y/z a factor of 0.2 to 1.5.

Independent of each other, the layers a) and e) may exhibit a partial or complete surface covering on one or both sides. The partial or complete covering may in particular be a printed image or pattern such as an outer lying pattern or counterprint. This may involve e.g. a relief, photogravure, offset, screen, helio or flexo-printing process. The printed image may be single or multicolored and preferably takes the form of advertising or product information or identification. Preferred are multicolored images.

The first layer a) in particular, and in some cases the second layer e), may exhibit a counter-print image that faces inwards i.e. facing the adhesive layer d) and/or a printed image may be present on the outward facing side of layer a) and in some cases on the second layer e).

The printed image b) is printed on layer a) or, if present, on the counterprint. The printed image b) may be a character or a series of characters such as figure-like or abstract graphic patterns, numbers and letters, figures, any form of writing or pattern. The printed image b) provides in particular initially hidden information for a competition, answer to a puzzle or the like. This information is exposed only after separating the first layer a) from the second layer e) i.e. by peeling or raising one layer from the other.

The size of the printed image b) is selected with respect to the packaging unit such as a covering or box in such a manner that a complete printed image b) fits onto e.g. a top surface of the covering or a surface of the box, or in the case of a pouch preferably at least one side of the pouch. In the case of lids at least one complete printed image should be arranged within the limits of the seam between the lid and the container.

The printed image b) is covered over by the separating layer c). The dimensions of the separating layer c) are selected such that at least the whole of the printed image is covered, or the separating layer c) extends beyond the printed image b). Advantageous is when the separating layer c) extends on all sides by a small amount e.g. by 1 to 5 mm beyond the whole of the printed image b). The separating layer c) may be a non-adhesing layer e.g. of polyamide, organic coatings, wax, paraffin or a hot melt material. The separating layer c) and the adhesive layer d) are chemically non-compatible and therefore do not bond to each other.

The packaging and lidding material according to the present invention also contains an adhesive layer d) over the whole of the surface—the adhesive layer containing or being comprised of an adhesive.

The adhesives may be e.g. starches, albumin, casein glues, cellulose ethers and cellulose esters such as methylcellulose or nitrocellulose, natural caoutchouc, synthetic caoutchouc, polyethylene such as copolymers of ethylene-vinyl-acetate, polypropylene, polyvinylesters such as polyvinylacetates, homopolymers or copolymers of polyvinylchloride such as vinylchloride and vinylacetate or vinylchloride and methacrylic-acid-esters, polyvinylether, polyvinyl-pyrrolidone, polystyrole, polyamides, polyesters, polyurethanes, polyisocyanates, epoxy resins, phenolic resins, resorcinic resins such as resorcin-formaldehyde and resorcin-phenolformaldehyde resins, ureic resins, melaminic-formaldehyde resins and non-reactive resins such as colophonium resins, tall-resins, hydrocarbon resins, carbamide-acid-ester resins or cyclohexanon resins or contain these substances.

The adhesives nay also contain softeners. The adhesives may be solvent-free or contain solvents such as benzine, toluol, xylol, methylene-chloride, trychlorethylene, trichlorethane, ascetic ester, acetone methylethylketone, methylisobutylketone or cyclohexanon. It is also possible to employ water-containing or water-soluble adhesives. The adhesives may also contain filler materials such as silicic acids, chalks, light or heavy gypsum or fibrous materials.

Various adhesive systems may be employed. For example adhesives that join without chemical reaction or solvent-free adhesive systems in the form of melting adhesive substances or adhesive plastisoles. It is also possible to employ adhesive solutions having solvents which evaporate before bonding or contact adhesives. It is also possible to employ adhesives having solvents that vaporize during the bonding process, or aqueous starch and dextrin adhesives or other aqueous adhesive solutions. Mention must also be made of aqueous dispersions of polymeric compounds such as dispersion adhesives. Use may also be made of reaction-type adhesives such as polymerization adhesives to which the two component polymerization adhesives and the single component adhesives belong. Further, use may be made of poly-addition type adhesives such as polyurethane adhesives, and finally poly-condensation adhesives such as polymethylol compounds, silicone adhesives or polyamide and poly-bezimidazoles. Further adhesives are starch and dextrin adhesives, polyvinylacetate dispersion adhesives, modified starch adhesives or copolymer-dispersions stabilised with casein or caoutchouc lactics or polyacrylester solutions or polyurethane adhesives.

The adhesive layer d) may also contain or comprise waxes, paraffins or hot-melts, or it may be an extruded layer of polymers such as polyolefins, polyamides or polyesters.

The adhesive in the adhesive layer d) is employed preferably in amounts of 1.4 to 12 g/m²; especially preferred is an amount of 4 to 7 g/m².

In order to join the first layer of material with the second layer, the adhesive layer may be deposited over the whole of the first layer a) and thereby also on the separating layer c). The second layer e), however, is preferably in the form of a roll or sheet and is coated with adhesive to form the adhesive layer d). The adhesive on the first layer a) or the second layer e) may, if desired, be activated. The second layer e) and the first layer a) are then brought together and adhesively joined via the adhesive layer d). Also the second layer e) and the first layer a) bearing the printed pattern b) and the separating layer c) may be brought together in a continuous manner and the adhesive layer d) introduced into the gap formed. The two layers a) and e) bond together, for example by means of contact or by application of heat and/or pressure.

The deposition of the adhesive may be performed by spraying, brushing, rolling, rakes or, blades, or in a reverse roll coating system, using the curtain-coater principle or e.g. in the case of melting adhesives using nozzle deposition equipment.

A sealing layer f) is preferably provided on the outward facing side of the second layer e). The sealing layer f) may be a sealing organic coating or a sealing film. The organic coatings or films contain as a rule polyolefins such as polyethylene, polypropylenes or ionomer resins. Instead of the sealing layer, the packaging or lidding materials may contain e.g. outer adhesive layers which, on contact or under the application of pressure and/or heat, form seams on boxes or pouches, or lid films are joined to the shoulder region of a container.

The sealing layers serve to form seams to make a box, pouch or sachet etc., or to seal closures on containers such as beakers, goblets, dishes, menu-dishes or glasses to the lid material.

In the invention according to the invention, as a rule the first layer a) on the packaging film or lidding film, faces outwards in the case of a covering, box or lidded container i.e. it forms the outside, and the second layer e) or the sealing layer f) on it faces inwards towards the contents of the covering, box, pouch or container etc. The arrangement of the layers and the sealing layer can be exchanged in the sense that e.g. the sealing layer f) is situated on the free face of the first layer a) and correspondingly, the first layer a) faces the contents of the covering, box, pouch or container.

Especially preferred is a packaging or lidding material according to the present invention having the following layers:
a) a plastic film based on oriented polypropylene, having a thickness of 18 to 22 $\mu$m, preferably 20 $\mu$m, or of polyethylene-terephthalate of thickness 10 to 15 m, preferably 12 $\mu$m,
b) a printed image
c) a separating layer
d) an adhesive layer covering the whole surface
e) a plastic film based on polyethylene-terephthalate of thickness 6 to 36 $\mu$m, which is metallized to a thickness of 10 to 60 nm (nanometer), preferably 10 to 30 nm on the side facing the adhesive layer d).

Likewise especially preferred is a packaging or lidding material according to the present invention having the following layers:
$a_0$) printing, such as advertising etc.,
a) a plastic film based on oriented polypropylene of thickness 18 to 22 $\mu$m, preferably 20 $\mu$m, or of polyethylene-terephthalate of thickness 10 to 15 $\mu$m, preferably 12 $\mu$m,
$a_1$) a metallized layer of thickness 10 to 60 nm, preferably 10 to 30 nm,
b) a printed image,
c) a separating layer
d) an adhesive layer covering the whole surface
e) a paper having a weight per unit area of 15 to 40 g/m²,
$e_1$) a non-adhesive coating as moisture barrier, preferably in the form of 0.5 to 5 g/m² preferably 1 to 3 g/m², of an organic coating, or usefully 2 to 20 g/m², preferably 4 to 12 g/m² of paraffin, wax or hot-melt.

Layer a), the plastic film, may be metallized on one or both sides. This results in further versions having the following sequence of layers: $a_0$)/metallized layer/layer a)/layer b) and the other layers mentioned from layer c) to $e_1$), or having the sequence printed image $a_0$)/metallized layer/layer a)/metallized layer/layer b) and the other layers from layer c) to $e_1$).

Especially preferred is also a packaging or lidding material according to the present invention containing the following layers:
$a_0$) printing, such as advertising etc.,
a) a paper having a weight per unit area of 15 to 40 g/m²,
$a_1$) a metallized layer of thickness 10 to 60 nm, preferably 10 to 30 nm,
b) a printed image,
c) a separating layer
d) an adhesive layer covering the whole surface
e) a plastic film based on polyethylene-terephthalate of thickness 6 to 36 $\mu$m which is metallized on the side facing the adhesive layer d) to a thickness of 10 to 60 nm, preferably from 10 to 30 nm.

In the above mentioned versions a sealing layer f) may be provided on the free side of the plastic film e) in the form of an organic sealing coating or sealable film of polyolefins such as polyethylene, polypropylene or an ionomer resin. In terms of definition the layers a) represent the first layer a) and layers e) the second layer.

The present packaging material for manufacturing packaging units or parts thereof, or lidding material for containers, feature two layers of material, may be presented such that a printed image b) is deposited on a printed or non-printed first layer a), the limits of which printed image b) lie within the dimensions of the packaging unit such as e.g. a pouch seam or seam between the lid and a container, and are smaller than the limiting dimensions of the packaging unit, a separating layer c) with dimensions the same as or larger than those of the printed image b) and smaller than those of the packaging unit and a second layer e) is deposited on the side of the separating layer c)—an adhesive layer d) being provided over the whole of the surface area between the first layer a) and the second layer e).

The adhesive layer d) completely covering the surface area may be applied between the layers a) with printed image or pattern and separating layer c) and the layer e) as these are running together. In another version layer a) with printed image b) and separating layer c) and/or layer e) may be coated with the adhesive layer and, after coating, layers a) and e) brought together. The printed image b) and the separating layer c) are to advantage—as with any printing on layer a)—deposited by a printing process.

The printing of layer a) in the form of an outer lying image and/or counterprint image, the printed image b), and the separating layer c) may be deposited on the first layer a) in the form of printed images laid down one after the other. The printed image b) may be deposited on layer a) in the same or in a subsequent printing machine in which the image to be printed on the outside and/or counterprint image is produced. For accurate covering of image b) by the separating layer c) the printing steps are to advantage performed on the same machine. As the counterprint image or counterprint image and image b) may be deposited in the same or different printing machines and the separating layer c) deposited in a separate printing machine. This last mentioned process is preferred e.g. for producing film-type materials for wrapping cheeses. The printing machines may be those employed e.g. for topography, offset, flexo, screen, helio, photogravure or copper photogravure printing, preferably those used for flexo or helio-printing processes.

The packaging material according to the invention for manufacturing packaging units or parts thereof, such as boxes, collapsible boxes, film-type packaging, pouches, bags, sachets, bins, wraps and coverings for basic and luxury foodstuffs or toys and the like, or lids for containers such as lids for beakers, goblets, dishes, menu dishes, pots or glasses, containing basic and luxury foodstuffs, or the packaging material may be employed as stamps or sealing strips. The stamps or sealing strips may, apart from their foreseen purpose, represent a decorating element or evidence of original pack. By basic and luxury foodstuffs is to be understood all such foodstuffs known for human or animal consumption e.g. apart from many other examples, sweet foodstuffs, yoghurts, cheeses, soups, pastes, baby foods, jams, preserved fruits or creamy desserts, dehydrated food preparations, drinks such as mineral water, aerated drinks and lemonades, instantly soluble or ground coffees, ready-made soups, confectionery goods etc.

DETAILED DESCRIPTION OF THE DRAWING

Figure 1:
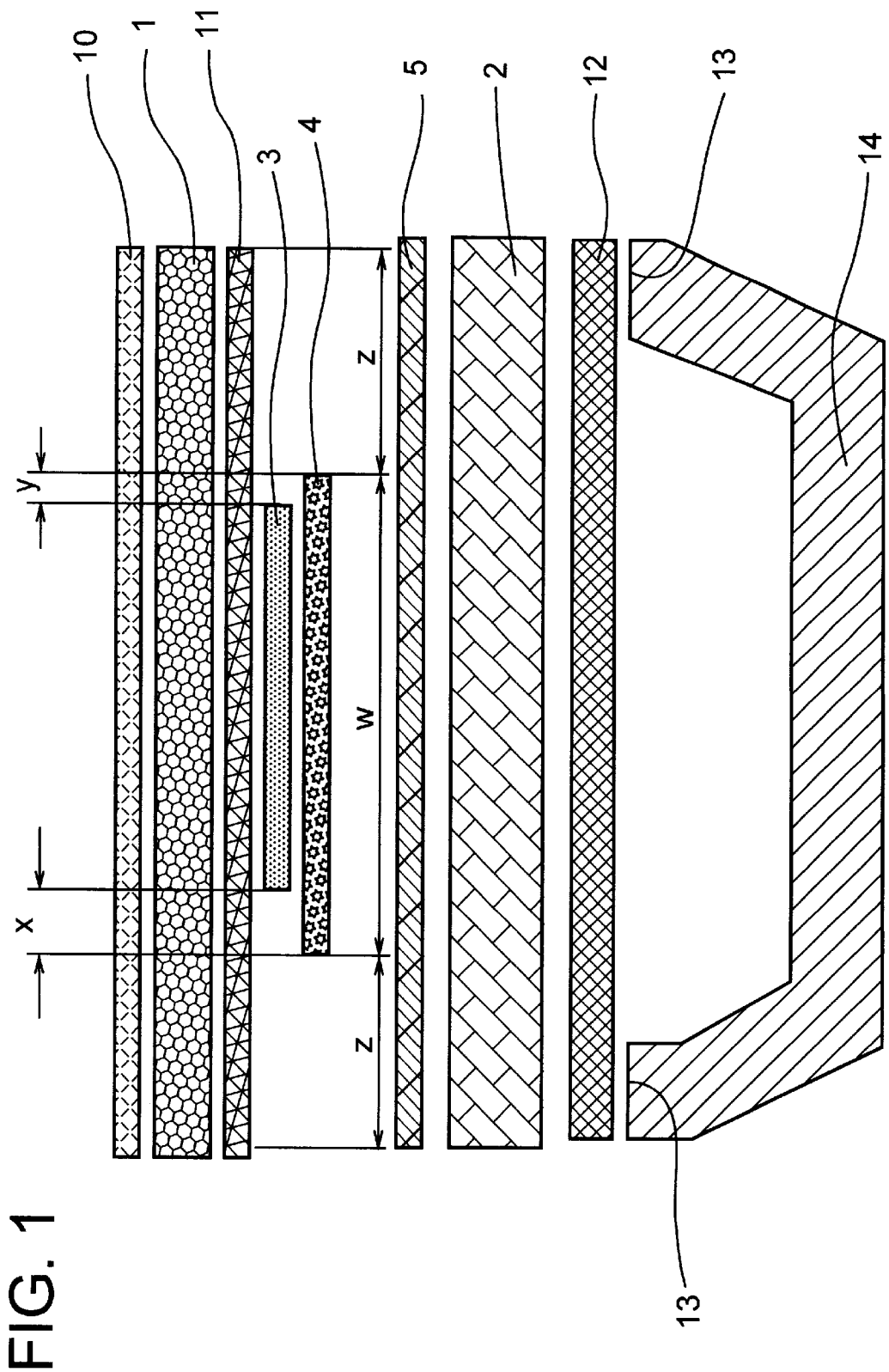
FIG. 1 is an exploded diagram of an embodiment of the invention packaging material.

FIG. 1 shows by way of example an exploded diagram of the make up of the packaging material according to the invention in film form and here as lidding material for a container. The first layer a) (1) bears printing (10) and a counterprint image (11). The printed image b) (3), for example the solution to a puzzle presented by the printing (10), is situated on one side of layer a) (1), in the present example via the counterprint image (11). In order for the solution to the puzzle to be read, it must be exposed. For that reason the printed image b) (3) is covered over by the separating layer c) (4). The separating layer c) (4) of dimension (w) covers the whole of the printed image b) (3) and projects beyond it at the side by an extent (x) and (y). The dimensions (x) and (y) may, according to the dimensions of the printed image b) (3), extend to the same or different extent beyond the edge of the printed image b) (3). Between the first layer a) (1) bearing the above mentioned layers and the second layer e) (2) is an adhesive layer d) (5) completely covering the whole surface area. The adhesive layer bonds permanently in regions (z), if desired over the counterprint image (11), to the first layer a) and the second layer e), thus joining both layers over the regions (z). Because of the mutual incompatibility of the two layers, no bond is formed between the adhesive layer d) (5) and the separating layer c) (4) in the region (w). The second layer e) (2) is covered on its free side with a sealing layer (12) Via this sealing layer (12) it is possible e.g. by selecting the appropriate position of the seams to form pouches, or the sealing layer (12) may be employed to join lids to the shoulder (13) of a container (14).

In all applications of the present packaging material for manufacturing packaging units such as film-type packaging or parts thereof or for lidding materials for containers, it is possible at least at one place—for example in the region of a pull-back tab on a pouch etc, or on the lid of a container—to pull the separating layer c) in a narrow zone up to the edge of the packaging unit or lid. As a result, a narrow zone e.g. about the width of a finger is created at which the two layers a) and e) are engaged and, by pulling layers a) and e) apart, the printed image b) is exposed.

What is claimed is:

1. A packaging material in the form of film for manufacturing forms of packaging or parts thereof, or lidding material for containers, containing at least two layers of material, the packaging or lidding material of packaging has the following material layers in alphabetical sequence:
    (a) a first layer of material containing a member selected from the group consisting of a paper, a plastic monofilm, a plastic composite, a metal foil and a composite of two or more of said members, and having a first side and an opposing second side;
    (b) a printed image or pattern deposited on the first side of the first layer (a), the limits of which lie within the dimensions of the packaging in question or the lid thereof;
    (c) a separating layer deposited on the first layer (a) over the printed image (b), the dimensions of the separating layer are the same or greater than the printed image (b) and smaller than the dimensions of the packaging or lid of the packaging;
    (e) a second layer of material containing a member selected from the group consisting of a paper, a plastic monofilm, a plastic composite, a metal foil and a composite of two or more of said members, and located on the first side of the first layer (a);
    (d) between the first layer (a) and the second layer (e), an adhesive layer covering the whole of the surface bonding the first layer (a) and the second layer (e),
where the separating layer (c) and the adhesive layer (d) are chemically non-compatible and do not bond to each other, so that the printed image (b) can be made visible by peeling the first layer of material (a) from the second layer of material (e).

2. The packaging or lidding material according to claim 1, wherein the first layer (a) exhibits printing on one or both sides and/or a metallized coating on one or both sides.

3. The packaging or lidding material according to claim 1, wherein the printed image (b) comprises figure or abstract graphic patterns, numbers, letters and/or figures in one or more printing colors.

4. The packaging or lidding material according to claim 1, wherein the adhesive layer (d) is present in an amount of 0.9 to 12 g/m$^2$, and bonds to the layers (a) and (e).

5. The packaging or lidding material according to claim 1, wherein a sealing layer (f) is provided on layer (e) facing outwards.

6. The packaging or lidding material according to claim 1, wherein the packaging and lidding material has the following layers in alphabetical sequence:
    (a) the first layer is an oriented polypropylene film having a thickness of 18 to 22 µm or a polyethylene-terephthalate film having a thickness of 10 to 15 µm;
    (b) the printed image;
    (c) the separating layer;
    (e) the second layer is a polyethylene-terephthalate film having a thickness of 6 to 36 µm, which is metallized to a thickness of 10 to 60 nm on the side of the second layer (e) facing the first side of the first layer (a);
    (d) the adhesive layer.

7. The packaging or lidding material according to claim 1, wherein the packaging and lidding material has the following layers in alphabetical sequence:
    ($a_0$) printing on the second surface of the first layer (a);
    (a) the first layer is an oriented polypropylene film having a thickness of 18 to 22 µm or a polyethylene-terephthalate film having a thickness of 10 to 15 µm;

($a_1$) a metallized layer having a thickness of 10 to 60 nm and located on the first surface of the first layer (a) between the first layer (a) and the printed image (b);

(b) the printed image;

(c) the separating layer;

(e) the second layer is a paper having a weight per unit area of 15 to 40 g/m$^2$;

($e_1$) a non-adhesive coating as a moisture barrier, located on side of the second layer (e) away from first layer (a);

(d) the adhesive layer.

8. The packaging or lidding material according to claim 7, wherein the non-adhesive coating ($e_1$) is an organic coating having a thickness of 0.5 to 5 g/m$^2$.

9. The packaging or lidding material according to claim 8, wherein the organic coating ($e_1$) is paraffin, wax or hot-melt having a thickness of 2 to 20 g/m$^2$.

10. The packaging or lidding material according to claim 1, wherein the packaging and lidding material has the following layers in alphabetical sequence:

($a_0$) printing on the second surface of the first layer (a);

(a) the first layer is a paper having a weight per unit area of 15 to 40 g/m$^2$;

($a_1$) a metallized layer having a thickness of 10 to 60 nm and located on the first surface of the first layer (a) between the first layer (a) and the printed image (b);

(b) the printed image;

(c) the separating layer;

(e) the second layer is a polyethylene-terephthalate film having a thickness of 6 to 36 μm, which is metallized to a thickness of 10 to 60 nm on side of the second layer (e) facing the first side of the first layer (a);

(d) the adhesive layer.

11. The packaging or lidding material according to claim 1, wherein sealing layer (f) is located on side of the second layer (e) away from first layer (a).

12. The packaging or lidding material according to claim 11, wherein the sealing layer (f) is a polyolefin layer or an ionomer resin layer.

13. A process for manufacturing packaging material for the manufacture of packaging units or parts thereof, or lidding material for containers, according to claim 1, containing at least two layers of material, comprising the steps of:

(i) depositing a printed image (b) on one side of a printed or non-printed, metallized or non-metallized first layer (a), the limits of the printed image (b) lie within the dimensions of the packaging;

(ii) depositing on top of printed image (b), a separating layer (c) the dimensions of which are the same or greater than the printed image (b) and smaller than the limiting dimensions of the packaging unit; and (iii) bringing the first layer (a) and a second layer (e) together on other side of the separating layer (c), an adhesive layer (d) covering the surface area completely being deposited between the first layer (a) and the second layer (b).

14. The process according to claim 13, wherein the separating layer (c) is deposited using a printing process.

* * * * *